Oct. 21, 1952   H. E. DANIELS   2,614,684
CONTROL APPARATUS FOR CONVEYER SYSTEMS
Filed Feb. 25, 1950   2 SHEETS—SHEET 1

INVENTOR.
Herbert E. Daniels
BY
Robert S. Dunham
ATTORNEY

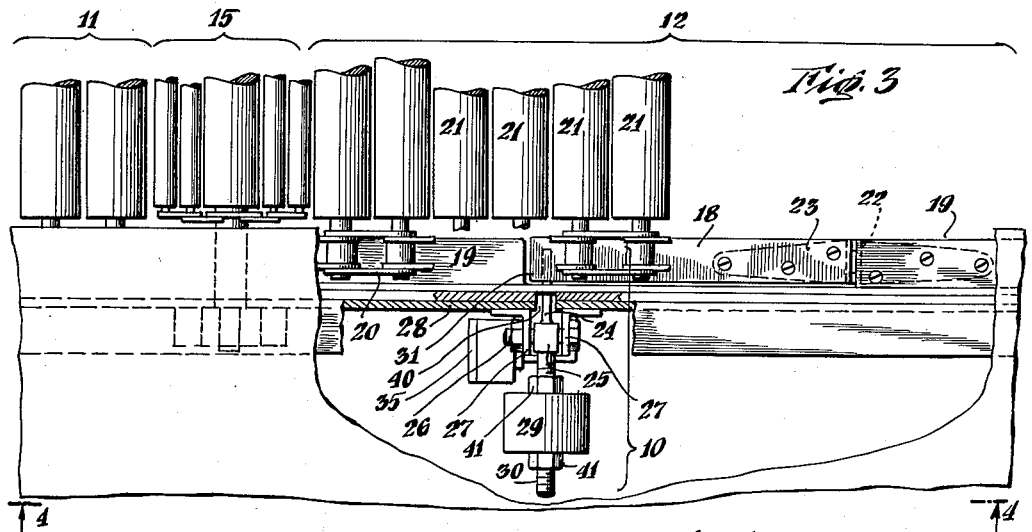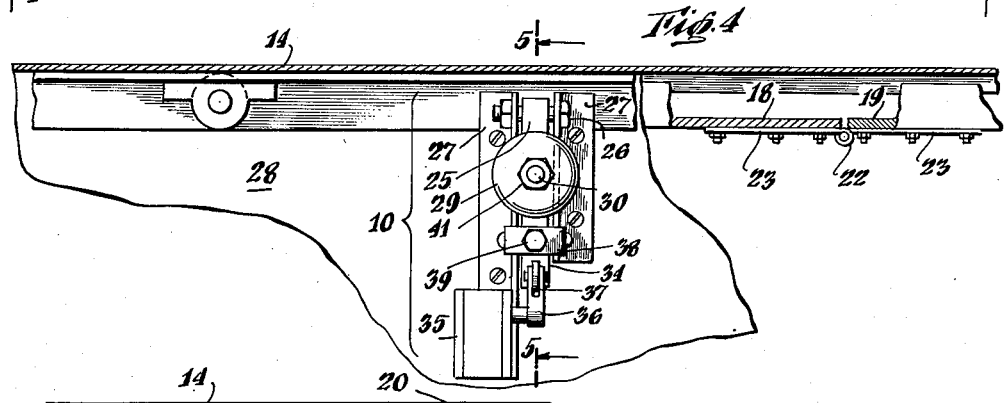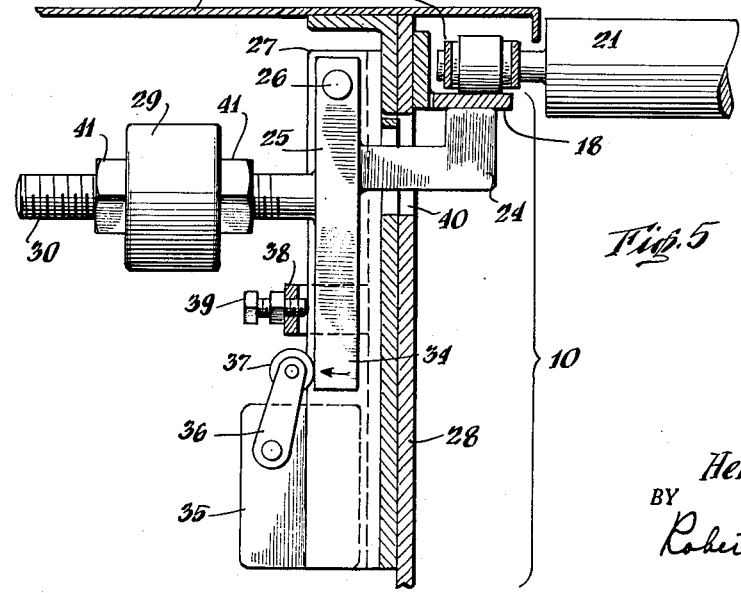

Patented Oct. 21, 1952

2,614,684

UNITED STATES PATENT OFFICE 2,614,684

CONTROL APPARATUS FOR CONVEYER SYSTEMS

Herbert E. Daniels, Orange, N. J., assignor to The Jampol Company, Inc., Brooklyn, N. Y., a corporation of New York Application February 25, 1950, Serial No. 146,315

4 Claims. (Cl. 198—82)

This invention relates to a method and apparatus for controlling the directional operation of several conveyor units in a conveyor system. It is particularly related to an apparatus for the stopping of one or a series of conveyor units, or changing the operational direction in the event that one or more of the units have been put in motion accidentally in the wrong direction. Therefore, the method and apparatus of the invention is readily adaptable for the control of several conveyor units which are desired to be operated in certain predetermined directional patterns with respect to each other.

Conveyor systems of the belt or power driven roller types are provided frequently with reversing mechanisms to permit the several units of said systems to be operated in forward and reverse directions so that articles to be conveyed may be moved all in one direction over said units or all in the reverse direction. Such systems may also be arranged so the articles may be moved in both directions from a central position of said units. It will be appreciated that if the conveyors may be operated individually in opposite directions, they may be inadvertently set in motion in reverse directions so that the articles move toward a central point, rather than away from the central point, with the result that the articles will pile up in the central position.

An important object of the present invention is to control the directional movement of one conveyor unit with respect to the directional movement of another conveyor unit in a conveying system.

Another important object is to provide a means by which articles moving over an area in one conveyor unit may affect the directional movement of the conveyor unit in the event that a second conveyor unit, toward which the articles are moving, is being operated in a direction with respect to the first conveyor unit contrary to a predetermined directional pattern.

A further object of the invention is to provide a directional controlling device for the several units of a conveyor system to prevent one or more of the said units from being put in operation accidentally, or otherwise in a manner contrary to certain desired predetermined directional patterns.

The invention is adapted to be used in a conveyor system having several units arranged for joint or complementary action for conveying articles. The several conveyor units may be independent in operation and reversible so that they may be operated to convey articles in either a forward or reverse direction the entire length of the conveyor system, or may be moved in two directions from a central point in the conveyor system. However, it is desired to prevent articles being moved along one conveyor unit toward a second conveyor unit while the second conveyor unit is stopped or while it is operating in a direction opposed to the movement of the articles on the first mentioned conveyor unit. The invention includes a switch means for controlling the first conveyor unit and means associated with the first conveyor unit responsive to articles moving over an area of said unit. An electrical circuit is provided for maintaining said first unit in operation in one direction, which includes the switch means in series with the directional holding coil for the first conveyor. The circuit also includes a means for by-passing the switch means so that the first conveyor is not responsive to the switch means when the by-passing means is in operation. Such by-passing means may be wired in parallel with the switch means and may be provided with a device for closing said parallel circuit under selected conditions. One arrangement is that the parallel by-pass means may be closed by a solenoid switch or relay which may be actuated by second circuit energized by the operation of the second conveyor unit in a selected direction.

For a more complete description of the invention, reference is made to the drawings wherein:

Fig. 3 is an enlarged plan view of the control mechanism apparatus of the invention in position in a roller driven conveyor system;

Fig. 4 is a side view with parts cut away of the apparatus taken along the line 4—4 in Fig. 3; and Fig. 5 is a transverse section through the conveyor of the apparatus taken along the line 5—5 in Fig. 4.

The present invention may be adapted to the control of the unit or various units in a single or multiple unit conveyor system in several operational patterns, but for the purposes of illustration the control apparatus of the invention will be described with relation to a two-unit conveyor system of the power driven roller type in which it is desired to operate the conveyor units both in the same direction either forward or reverse also both moving in opposite directions to each other so as to move articles carried on the conveyors outward from a central point. However, it is desired to prevent one conveyor from carrying articles toward the second conveyor while the second conveyor is either stopped or operating toward the first article moving conveyor.

Figure 1:
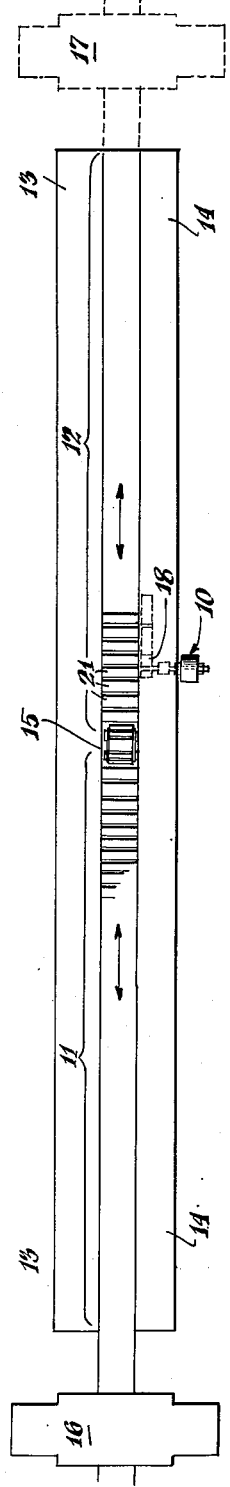
Fig. 1 is a schematic plan view of a two-unit conveyor system indicating the position of the apparatus of the present invention in such a system.

In Fig. 1, power driven roller conveyor units 11 and 12 are shown in plan view in a typical inline installation such as might be used in the mail room of a newspaper plant or in a packing or packaging operation with work tables 13 and 14 disposed along the sides of the conveyor units. A roller bridge 15 may be located in the break or gap between the conveyor units at the central position of the conveying system as shown, or otherwise, as desired. In the mail room of a newspaper plant, newspaper are received, counted, and stacked on the tables 13 and 14 and placed on the conveyors and moved either to the left or to the right in Fig. 1. In a typical operation, the stacks of newspapers will be moved along the conveyors 11 and 12 to the left as viewed in Fig. 1, through the tying-in machine illustrated diagrammatically at 16, wherein the stacks of papers are tied or secured with wire before shipment.

Under certain conditions, it may be desired to provide a second tying-in machine illustrated by the dash line at 17 at the right-hand end of the conveyor system as viewed in Fig. 1. In such an arrangement, the newspapers may be carried in two directions from the central position, the conveyor 11 moving the papers to the left through the tying-in machine 16 and the conveyor 12 moving the stacks of papers to the right through the tying-in machine 17. In the event of a breakdown of either tying-in machine or in other circumstances making it desirable to convey the newspapers through only one of the tying-in machines, both conveyor units 11 and 12 can be operated in the same direction, the newspapers being conveyed from one unit to the other across roller bridge 15. In a conveying system having the flexibility necessary for such independent reversing action of the two conveying units, it will be appreciated that in certain circumstances, either accidentally or otherwise, newspapers or other articles being conveyed may be moved along one conveyor unit toward the other conveyor unit while the other or second conveyor unit is stopped or is moving articles toward the first conveying unit. In either situation, the newspapers or other articles being conveyed would pile up in the center and would disrupt the conveying system. The present invention is directed to the provision of an apparatus for preventing the movement of articles toward a conveyor which is not operating or which is operating contrary to the direction of the conveyor upon which the articles are moving.

The apparatus consists generally of a means which is responsive to the weight of an article passing over a portion or area of one conveyor, such means being arranged to actuate a switch which in turn may open or close the direction holding circuit for the conveyor upon which the articles are moving, or may be arranged to stop or reverse the direction of movement of the conveyor. The means which is responsive to the articles passing over an area of the conveyor includes a hinged portion 18 of the supporting trackway 19 of a standard power driven roller conveyor. The trackway 19 supports the link chain 20 in which the rollers 21 are rotatably mounted. The hinged portion 18 of the trackway is pivotally mounted to the trackway 19 at the point 22 by the hinge 23 and is supported at its other end 31 by the arm 24 of the switch lever bar 25. The bar 25 is pivotally mounted at 26 in the brackets 27 which are suitably secured to the frame 28 of the power driven roller conveyor 12. Counterweight 29 is provided on the threaded arm 30 which extends on the opposite side of the lever bar 25 from the arm 24 and provides sufficient upward pressure to support the free end 31 of the hinged bar 18 to maintain the hinged bar in the horizontal position, substantially in the plane of the trackway 19. The upward pressure of the arm 24 is sufficient to maintain the hinged bar in place against the weight of the link chain 20 of the conveyor unit when the rollers 21 are not carrying a load. When the rollers 21 are carrying a load over the area of the hinged bar, the lever arm is not capable of supporting the hinged bar 18 in the horizontal position and the arm 24 is depressed by the weight on the hinged bar 18. As the hinged bar 18 is depressed, the lever bar 25 is caused to pivot so that the lower extension 34 of the bar 25 is caused to move outwardly as indicated by the arrow in Fig. 5. A micro switch 35 is positioned with a link arm 36 to the switch means with a contacting roller 37 disposed in the path of the lower extension 34 of the lever bar 25 as the extension 34 moves outwardly under the weight of a load on the conveyor. A yoke 38 is provided around the lower extension 34 to limit the outward movement. A set screw 39 is provided in the transverse portion of the yoke to permit the adjustment of the outward limit of the lever arm. To effect a suitable switching action, it is only necessary that the lower extension arm 34 move outward a relatively short distance, e. g., a movement of as little as a sixteenth of an inch having been found satisfactory. A port 40 is provided in the side of the frame 28 of the conveyor to receive the supporting arm 24 of the lever bar 25. The counterweight 29 is arranged for lateral adjustment inward or outward from the lever bar 25 to vary the upward pressure of the support arm 24. Lock nuts 41 are provided to maintain the counterweight 29 in any desired position to which it is adjusted.

Thus, it will be seen that, in operation when the rollers 21 are free of articles as they pass over the area of the hinged bar 18, the arm 24 will give sufficient support to the hinged bar 18, providing the counterweight has been properly adjusted to maintain the hinged bar 18 in horizontal position and, consequently, to maintain the lever bar in vertical position. However, as an article moves along the conveyor across the area of the hinged bar, the weight of the article will cause the outer end 31 of the hinged bar 18 to move downward thereby causing the lower extension 34 of the lever bar 25 to move outwardly and actuate the micro switch 35.

Figure 2:
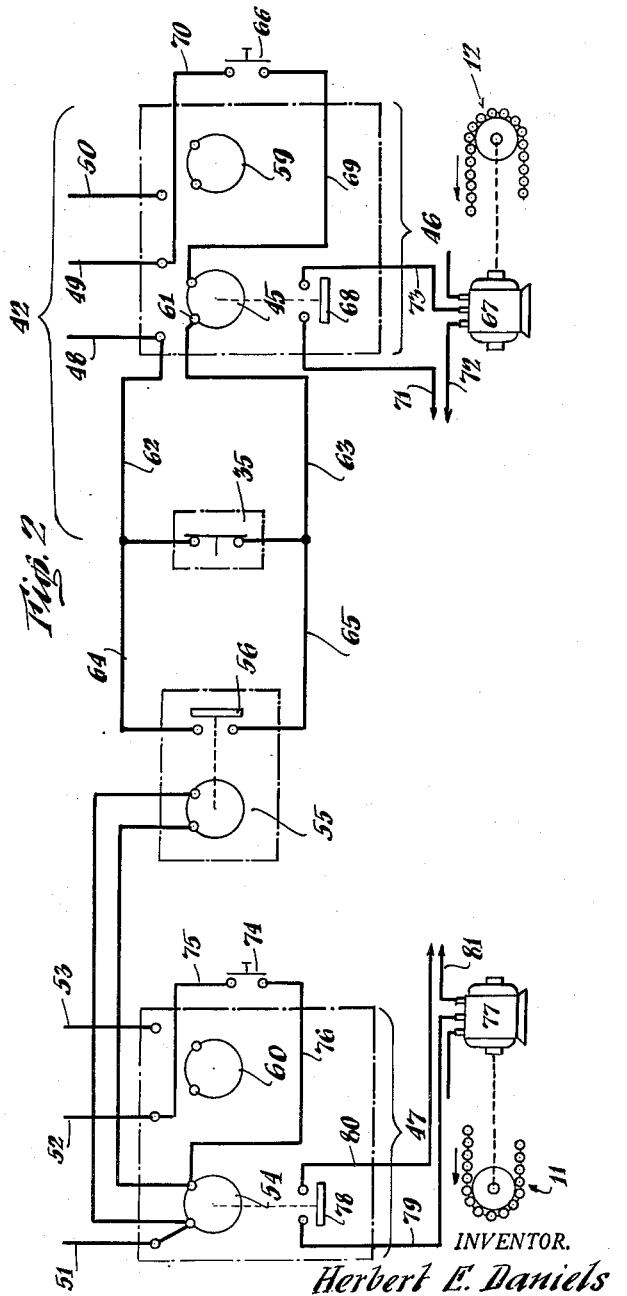
Fig. 2 is a wiring diagram of an arrangement for using the apparatus of this invention.

For a complete illustration of a mean of utilizing this invention, reference is made to the wiring diagram Fig. 2 which illustrates a suitable control arrangement for the conveying system shown in Fig. 1.

In the wiring diagram of Fig. 2, the micro switch 35 is connected in series with the directional holding coil 45 for the conveyor 12. The square 46, indicated by dash lines, is a simplified diagrammatic representation of the directional control box for the conveyor 12. Similarly, the dash-line square 47 is a diagrammatic representation of the control box for conveyor 11.

Lines 48, 49, 50 are the power intake lines for the box 46. In standard control circuits of the type contemplated, when a directional holding coil or relay has been energized by manual control means, for starting, reversing, or stopping the conveyor motor, the holding coil or relay effects the closing of the power circuits for the conveyor motor. Since such an arrangement is well known for remote control operation of an electrical motor, further description will not be included. It is sufficient to note that when the manual switch 66 is closed the directional holding coil 45 will be energized through the circuits 48, 62, 35, 63 and 49, 70, 66, 69. When the relay or directional holding coil 45 is energized, it closes the switch 68 to close the power line 71, 73, thereby starting the motor 67 to drive the conveyor 12 in the direction indicated. If the circuit from the line 48 through to terminal 61 is broken at switch 35 the holding coil will cease to be energized and the switch 68 will open thereby breaking the power line through 71, 68, 73 which together with power line 72 drives the motor 67 in the direction indicated. Such a break in the circuit of the holding coil 45 can be caused when a bundle of newspapers passes over the area where the micro switch 35 is located, the weight of the bundle tripping the micro switch 35 thereby breaking the circuit through the lines 62 and 63. It will be appreciated that the micro switch 35 will be effective to control the conveyor motor only when the motor is being operated in the direction indicated by the directional holding coil, for, when the conveyor 12 is moving in the reverse direction, i. e. from left to right, the power circuit is closed by energizing the circuit of holding 59. In the present instance, the directional holding coil 45 is energized to operate the conveyor 12 to the left as viewed in Fig. 1.

In the control box 47 for use with the motor 77 for conveyor 11, the lines 51, 52, and 53 are the power intake lines, and, as shown in the diagram of Fig. 2, the directional holding coil or relay 54 is wired in parallel with the normally opened relay 55 so that when the manual remote control 74 for the conveyor 11 energizes the directional holding coil 54 through the lines 52, 75, 76, the relay 55 is also energized. When the directional holding coil 54 is energized, the switch 78 closes and the power circuit through lines 80, 79, and 81 is completed to operate the motor 77 to move the conveyor 11 to the left as indicated.

Switch 56, which is wired in parallel with the micro switch 35, is closed when the relay coil 55 is energized. It will be appreciated that a suitable solenoid switch may be substituted for the relay 55 and the switch 56. Thus, in the described arrangement, the directional holding coil 54 is arranged to be energized to close the power circuit to the motor 77 of the conveyor 11 in order to drive conveyor 11 to the left as viewed in Fig. 1. Therefore, in the wiring diagram, the circuits represented are those which are utilized for driving the two conveyors 11 and 12 from right to left. When the directional holding coil 54 is energized, switch 56 closes, and the circuit for the holding coil 45 is maintained regardless of any actuation of the micro switch 35.

Thus, during a period of operation, when the conveyor 11 is running to the left, that is, in the same direction that the conveyor 12 is running, the micro switch is rendered ineffective because the circuit between line 48 and the coil 45 is carried through the closed circuit 62, 64, switch 56, 65, and 63. Bundles of newspapers travelling on conveyor 12 will not cause the conveyor 12 to stop when they reach the micro switch position 10. However, if the forward conveyor 11 is stopped or is operating in the reverse direction, the relay coil 55 will be de-energized and the switch 56 will remain open thus breaking the by-pass circuit 64, 65. The conveyor 12 will thereafter be stopped when a bundle of newspapers passes over the area in which the micro switch 35 is located and actuates the micro switch to break the circuits 62, 35, 63. It will be appreciated that both conveyors may be operated from left to right, that is, to move the newspapers or other goods toward the tying-in machine 17 without being affected by the micro switch 35 in the presently described wiring arrangement because the micro switch is wired only into the circuit containing the directional holding coil 45. When the conveyor 12, and its companion conveyor 11, are operating in the reverse direction, i. e., from left to right as viewed in Fig. 1, manual direction controls actuate the directional holding coils or relays 59 and 60 respectively, thereby actuating the power circuits to operate the motors 67 and 77 in the reverse direction, i. e. from left to right. For simplification of the wiring diagram the circuits for the coils 59 and 60 and the switch means for the reverse phase of the motors 67 are not shown. However, it will be appreciated that the micro switch is inoperable in the reverse direction for the power circuit for the motor 67 is not controlled by the directional holding coil 45. Thus, the circuit described will be effective to prevent the piling up of articles in a central position in the event that conveyor units 11 and 12 of the conveyor system are operating toward each other or while the conveyor 11 is not in operation and conveyor 12 is operating from right to left.

Similar control means may be provided for the stopping of conveyor 11 or other conveyor units in a conveyor system to provide for a situation wherein conveyor 12 is stopped or operating toward conveyor 11 and conveyor 11 is operating toward conveyor 12. However, in the described form, the breaking of the circuit through 62, 35, and 63 may be used to stop both conveyors if they are travelling toward each other.

It will be appreciated of course that the micro switch device and its associated elements above described may be utilized in many ways for controlling the operation of a conveyor. For example, one use of the device would be to provide the hinged bar near one end of a single unit conveyor system so that articles passing over the conveyor adjacent to that end would actuate the switch thereby either stopping or reversing the conveyor. Such an arrangement would be useful in preventing articles from moving in a wrong direction on a reversible conveyor and to prevent them from falling off an unguarded end of a conveyor. Such an arrangement is illustrated by that portion of the wiring diagram, indicated generally at 42, in Fig. 2, wherein the micro switch 35 is shown in series with a directional holding coil 45 energized for maintaining a conveyor in operation in one direction. As long as the conveyor is operating in the opposite direction, the switch means is inoperative.

It will be appreciated that the embodiment of the invention described above is merely illustrative and that it can be adapted to various conveyor control systems. The illustrated arrangement achieves the objects of the invention to control the directional movement of one conveyor unit with respect to the directional movement of another unit by having a control responsive to articles moving over the conveyor system. Such controls are advantageous in maintaining a predetermined operational pattern and guarding against accidental or inadvertent departures from such pattern.

In accordance with the patent statutes, I have herein described the principle of operation of this invention together with the elements which I now consider the best embodiments thereof, but I desire to have it understood that the structure disclosed is only illustrative and the invention can be carried out by other means, also while the form described is designed to use the various features and elements in combination with relations described, some of these may be altered and modified without departing from the scope of the invention.

What is claimed is:

1. In a conveyor system including a pair of conveyors aligned in series along a common pathway, each conveyor having reversible driving means therefor, electrical control means for operating the driving means of one conveyor to move in a direction toward the other conveyor, and a second electrical control means for operating the driving means of the other conveyor to move in a direction away from the first conveyor, in combination, a weight-responsive control device associated with said first conveyor at a predetermined locality of its path, a circuit for said first control means energizable to operate the latter to effect operation of the first driving means in the aforesaid direction toward the other conveyor, said first control device including means in said first circuit, responsive to a predetermined weight on said first conveyor to interrupt the said circuit and thereby prevent operation of said first driving means, and means associated with the second control means and including switch means in said first circuit in parallel with the said circuit-interrupting means for maintaining operation of the first driving means when the second driving means is operating in the aforesaid direction away from the second conveyor.

2. In a conveyor system having several conveyor units adapted to be operated in certain predetermined directional patterns with respect to each other, an apparatus to stop one of said conveyor units when articles are moving over it contrary to the predetermined directional patterns, said apparatus comprising, a first electrical circuit for maintaining a first conveyor unit in operation in one direction, a first switch means for opening and closing said circuit, means responsive to the weight of articles passing over said first conveyor unit and disposed in association with an area of said first conveyor unit, said article responsive means being adapted to actuate the first switch means to open the electrical circuit, a second switch means wired in parallel with said first switch means, in said first electrical circuit, a second electrical circuit energized to maintain a second conveyor unit in operation in a selected direction with respect to the first conveyor unit in accordance with a predetermined directional pattern, relay means in said second circuit, adjacent said second switch, for maintaining said second switch means in a closed position while said second circuit is energized.

3. In a conveyor system having more than one article conveyor unit and in which each unit may be operated independently of each other and each may be operated either toward or away from the other, an apparatus associated with an area of one of said conveyor units and responsive to articles moving over said conveyor unit and adapted to stop said conveyor unit in the event that the second conveyor unit is operating in a direction contrary to a predetermined operational pattern, said pattern being arranged to permit the conveyors to operate away from each other, and to permit the first conveyor unit to operate toward the second conveyor unit while the second conveyor unit is operating away from the first conveyor unit, and in which it is desired to stop the first conveyor unit in the event that it is operating toward the second conveyor unit while the second conveyor unit is operating toward the first conveyor unit and when the second conveyor unit is stopped, said apparatus, comprising, in combination, a switch means, a means associated with an area of the first article conveyor unit responsive to the weight of articles passing over said area and adapted to operate said switch, said switch being arranged to stop the first conveyor unit, means associated with the second conveyor unit for rendering said switch inoperative when both said conveyor units are operating in accordance with said desired predetermined directional pattern, said means for rendering the switch inoperative including a circuit for by-passing the switch, which circuit is closed when both conveyors are operating in accordance with said desired directional pattern.

4. The apparatus of claim 1 wherein conveyors are of the power driven roller type and wherein the weight responsive control device associated with the first conveyor, comprises, in combination, a section of trackway in an area of said first conveyor, hinged on one end to the said supporting trackway and free at its other end for vertical movement, a lever bar pivotally mounted adjacent said section of trackway and having an outwardly and upwardly extending supporting arm arranged on one side of said lever bar and an outwardly extending counter-balancing arm oppositely disposed to said supporting arm, said supporting arm being arranged so as to support the free end of the movable section of the trackway, and said counter-weight arm having sufficient weight to permit the supporting arm to maintain the movable trackway section in horizontal position when there is no article load passing over the said area of said roller conveyor, a lower extension of said lever bar, and a conveyor controlled switch disposed so as to be contacted when said lower extension is moved, a yoke loosely surrounding said lower extension and adapted to limit its movement, said lower extension being movable in response to the movable section of trackway when an article load passes over said area of the trackway.

HERBERT E. DANIELS.

REFERENCES CITED

The following references are of record in the file of this patent:

UNITED STATES PATENTS

| Number | Name | Date |
|---|---|---|
| 1,723,283 | Fisher | Sept. 17, 1929 |
| 2,372,131 | Smith | Mar. 20, 1945 |
| 2,521,877 | Cheeseman | Sept. 12, 1950 |